Oct. 19, 1943.   C. MEYER   2,332,104
APPARATUS TO CONTROL THE FLOW OF GOODS
Filed June 17, 1942   6 Sheets-Sheet 1

INVENTOR
CHARLES MEYER
BY
ATTORNEY

Oct. 19, 1943.  C. MEYER  2,332,104
APPARATUS TO CONTROL THE FLOW OF GOODS
Filed June 17, 1942  6 Sheets-Sheet 2
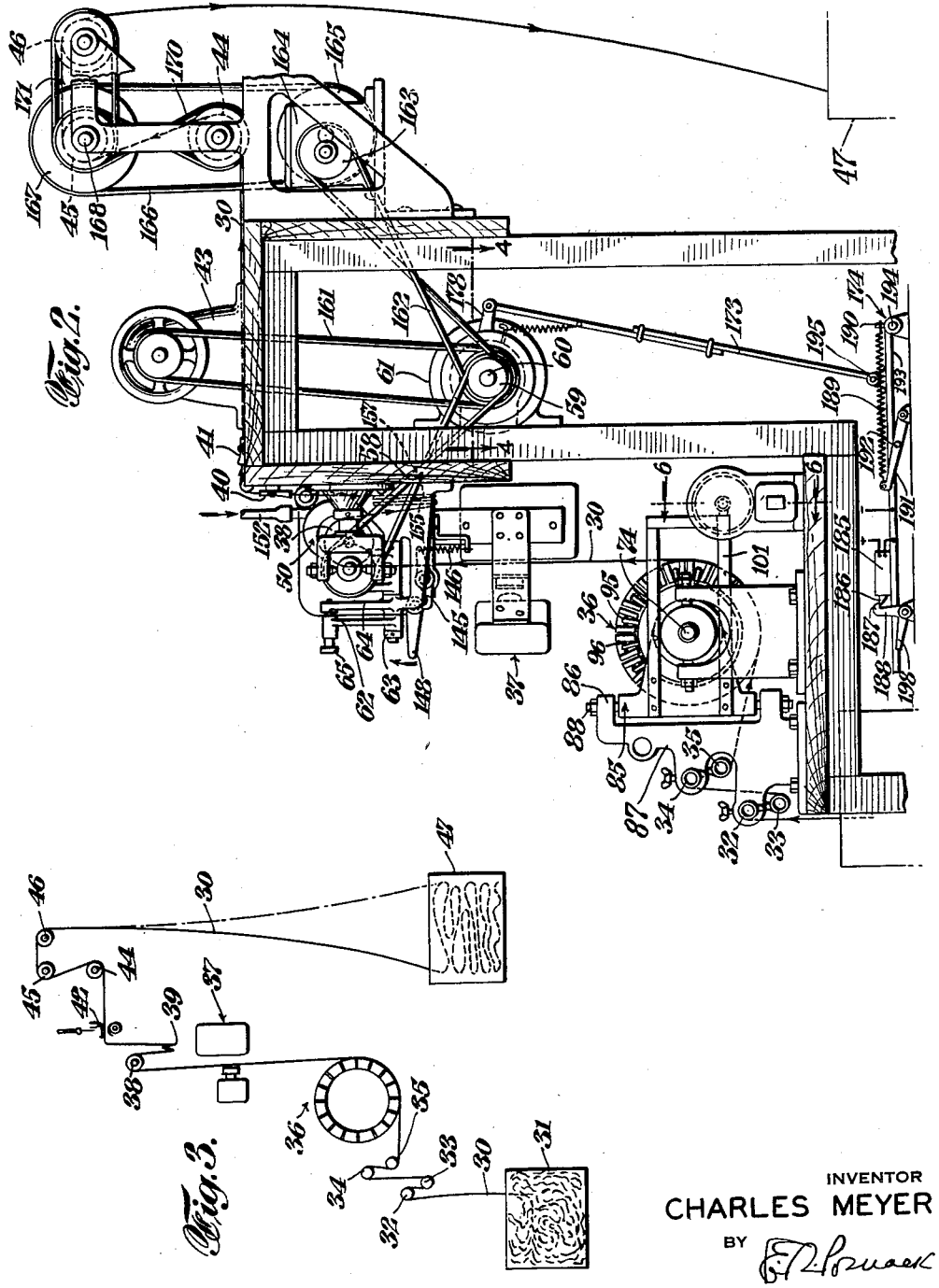
INVENTOR
CHARLES MEYER
BY
ATTORNEY

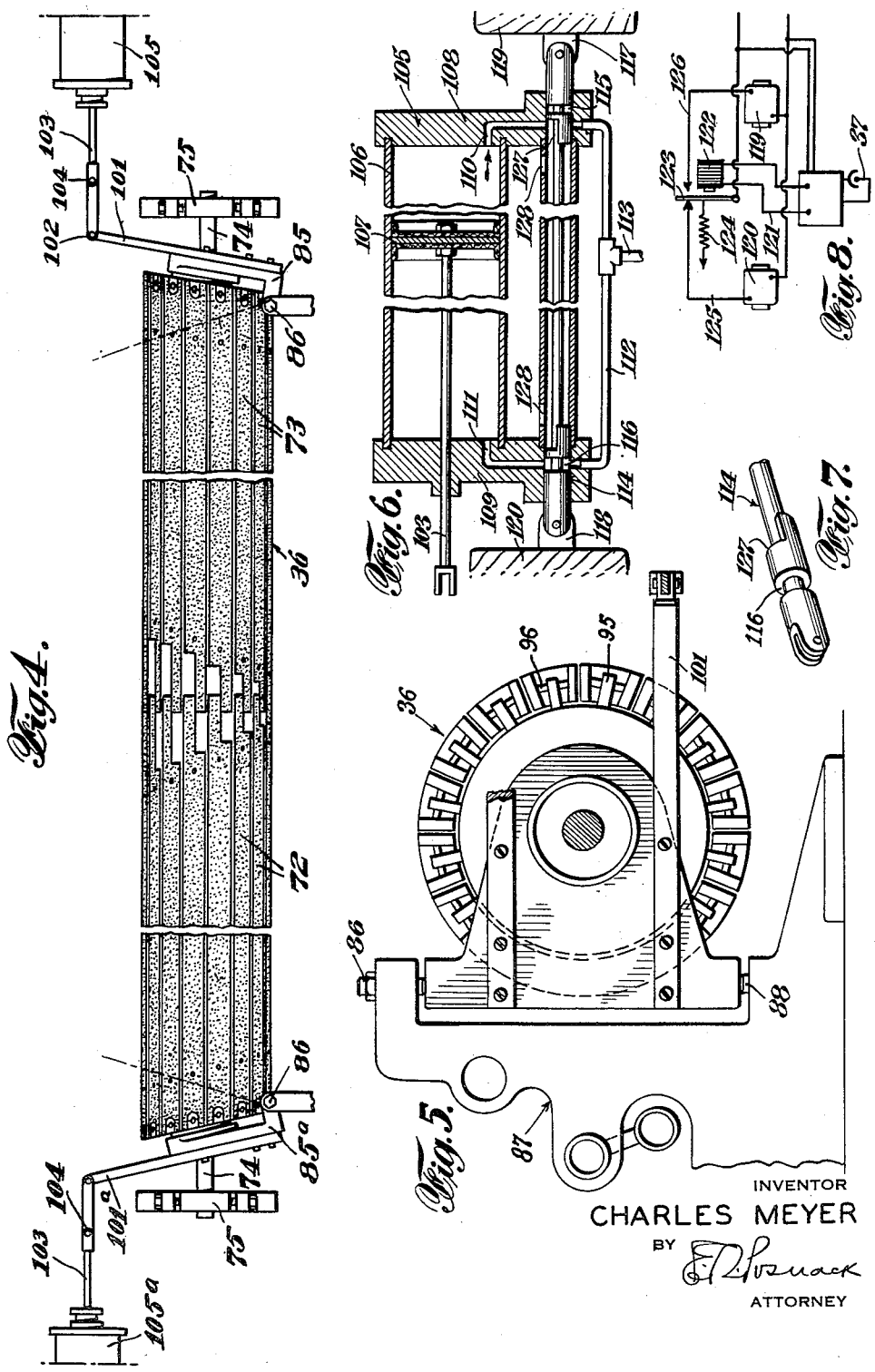

Oct. 19, 1943.  C. MEYER  2,332,104
APPARATUS TO CONTROL THE FLOW OF GOODS
Filed June 17, 1942  6 Sheets-Sheet 4
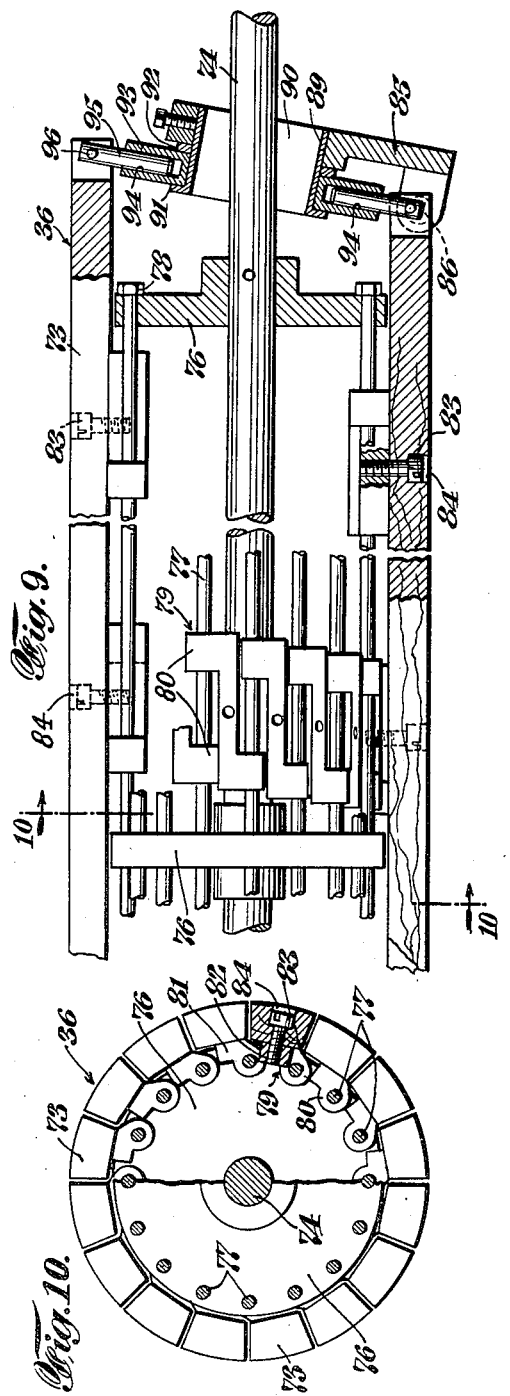
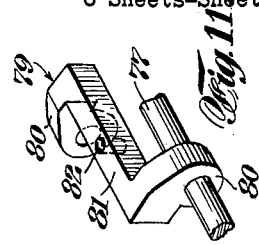
INVENTOR
CHARLES MEYER
BY
ATTORNEY Oct. 19, 1943.   C. MEYER   2,332,104
APPARATUS TO CONTROL THE FLOW OF GOODS
Filed June 17, 1942   6 Sheets-Sheet 5

INVENTOR
CHARLES MEYER
BY
ATTORNEY

Oct. 19, 1943.  C. MEYER  2,332,104
APPARATUS TO CONTROL THE FLOW OF GOODS
Filed June 17, 1942  6 Sheets-Sheet 6
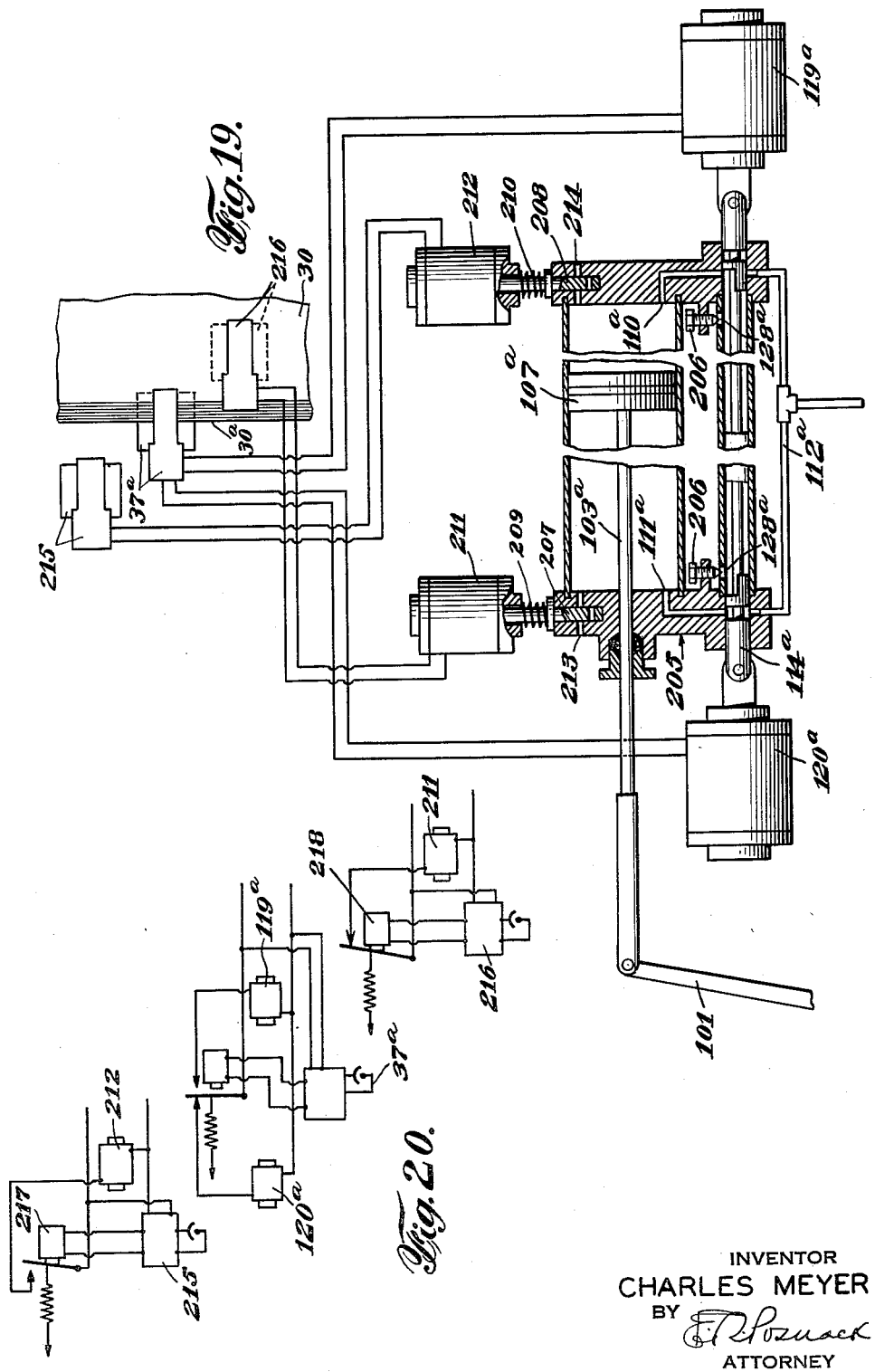
INVENTOR
CHARLES MEYER
BY
ATTORNEY Patented Oct. 19, 1943

2,332,104

UNITED STATES PATENT OFFICE 2,332,104

APPARATUS TO CONTROL THE FLOW OF GOODS

Charles Meyer, Yonkers, N. Y., assignor to Bartmann & Bixer Inc., New York, N. Y., a corporation of New York Application June 17, 1942, Serial No. 447,477

6 Claims. (Cl. 271—2.6)

This invention relates to a method and apparatus for controlling the flow of a continuous length of pliable material, particularly although not necessarily in preparation for one or more manufacturing operations, this application being a continuation in part of that filed on June 20, 1940, Serial No. 341,503, allowed December 29, 1941, which application has matured into Patent No. 2,289,796.

It is primarily within the contemplation of this invention to effect a tracking of both lateral edges of a web of traveling material whereby said edges are continuously maintained a predetermined distance apart, thereby enabling the web to be received by the clamps of a tentering frame or to be operatively engaged by other apparatus of fixed width. And in this aspect of my invention it is an object to permit an uninterrupted flow or longitudinal movement of the web while effecting a lateral stretching or tensioning thereof, or a crowding of the material towards the medial portion thereof, to accommodate webs of non-uniform and varying widths, as well as to uninterruptedly guide a web of uniform width without any stretching or crowding whatsoever.

It is also an important object of my invention to automatically guide or effect a tracking of one or both of the lateral edges of the moving material along a predetermined path, whereby such tracked edges could be directed along a straight line so as to cause them to pass predetermined points at which manufacturing steps can be performed thereon. Heretofore whenever it was desired to track an edge of moving material, such as a continuous length of pliable cloth, it was necessary to employ one of several rather cumbersome procedures, one method involving the carrying of the material over a roller and producing a lateral shifting of the entire roller. Another method has been to place the material in careful flat folds upon a platform, the edge of the material to be tracked being carefully arranged as closely as possible in one vertical plane, and then moving the entire platform laterally to make any necessary correction. It is within the contemplation of my invention to simplify the means of tracking a length of moving material by eliminating the necessity of any shifting of the entire roller or platform, and enabling a straight-line tracking to be effected by simple photo-electric means, regardless of the disordered condition of the material on the platform from which the travel of the material begins.

And it is a further object in respect to the above-described aspects of my invention, to enable both lateral edges of the web to be independently controlled, whereby each of said edges will be subject to independent corrective movements.

Another object of my invention is to provide, in an apparatus of the above-described category, photo-electric means in conjunction with sensitive corrective mechanism quickly responsive thereto, whereby the apparatus will have practical application to webs traveling at relatively high speeds.

It is a further important object of my invention to provide photo-electric tracking means where, although the light source and the light-sensitive means are on opposite sides of the material, the photo-electric relay will not be actuated even if the material is very sheer or contains many relatively large interstices. More specifically, it is an objective of this invention to permit even curtain or lace material to operatively interrupt the beam of light between the light source and the light-sensitive means.

Another important object of my invention is to enable the aforesaid tracking, stretching or crowding operations to be performed simultaneously, so that neither operation affects the other.

Other objects, features and advantages will appear from the drawings and the description hereinafter given.

Referring to the drawings,

Figure 2 is a side elevation of the invention of Figure 1 shown partly in section.

Figure 3 is a schematic side elevation of the invention of Figure 1, analogous to Figure 2, showing the path of the material.

Figure 4 is a plan view of the control drum of my invention for causing lateral corrective shiftings of both lateral edges of the web in accordance with actuating movements from the tracking mechanism forming part of my invention.

Figure 5 is a fragmentary section of Figure 1 taken along line 5—5, showing an end view of the control drum.

Figure 6 is a vertical section of Figure 2 substantially along line 6—6 thereof, showing one form of a pneumatically operated reciprocating piston operatively associated with the control drum for imparting continuous corrective oscillations thereto.

Figure 7 is a fragmentary perspective of the air valve associated with the structure of Figure 6.

Figure 8 is a wiring diagram of the circuit through the two solenoids and photo-electric cell associated with the structure of Figure 6.

Figure 9 is an enlarged fragmentary sectional plan view of the control drum taken substantially along line 9—9 of Figure 1.

Figure 10 is a section of the control drum taken substantially along line 10—10 of Figure 9, part of the section being taken through a fastening screw connecting a slide member and a slat on the drum.

Figure 11 is a fragmentary perspective of a slide member operatively associated with one of the rods constituting part of the control drum.

Figure 1:
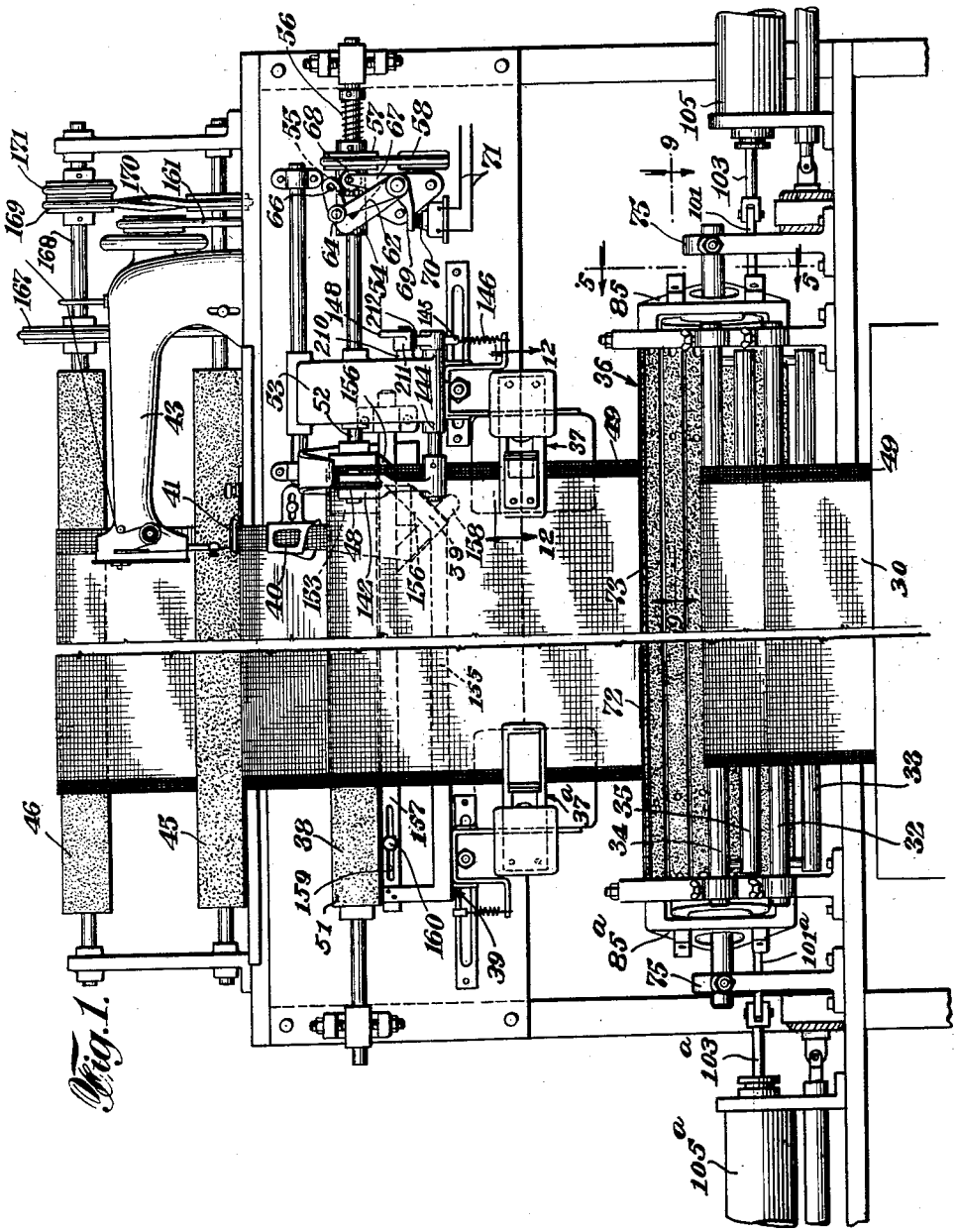
Figure 1 is a front view of my invention as employed in conjunction with an apparatus for forming hems on a continuous sheet of curtain material.
Figure 12:
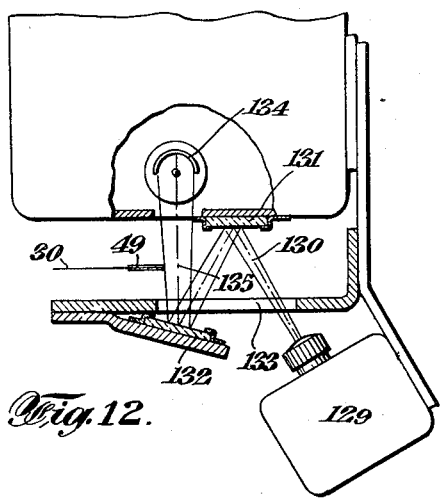
Figure 12 is a semi-diagrammatic sectional plan view taken substantially along line 12—12 of Figure 1, showing the preferred photo-electric arrangement for tracking one edge of the material.
Figure 13:
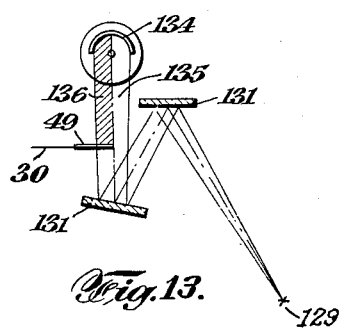
Figure 13 is a diagrammatic view of the light sources, photo-electric cell, intervening reflectors, and one edge of the material in a beam-intercepting position.

Figure 19 is a vertical fragmentary section, substantially similar to that of Figure 6, showing a modification of the reciprocating device employable for webs traveling at relatively high speeds, this figure also showing, in semi-diagrammatic form, the photo-electric arrangement operatively associated with the said reciprocating device, and Figure 20 is a wiring diagram of the circuits through the solenoid and photo-electric units in accordance with the arrangement of Figure 19.

The drawings show portions of the structure of my invention described in my said prior application filed June 20, 1940, of which this is a continuation in part. Although the drawings are directed specifically to a hem-producing apparatus with certain control mechanisms associated therewith, my invention is nevertheless not limited to this specific structure inasmuch as it can be employed with equal effectiveness in conjunction with other types of apparatus.

It is not deemed necessary, in this specification, to set forth in detail all the structural elements of the apparatus illustrated in the drawings, in view of the fact that they are adequately and thoroughly described in my said parent application, Serial No. 341,503 and in certain other letters patent which will hereinafter be referred to. However, such parts of the apparatus that have a direct bearing on an understanding of the present invention will be referred to and described.

In the form of my invention illustrated, the path of the material 30, as illustrated in the drawings, extends upwardly from container 31 (Figure 3), around and in slidable engagement with the parallel tensioning bars 32, 33, 34 and 35, and thence around the underside and rear of the control drum 36 with which it is preferably, although not necessarily, in contact along one-quarter of its periphery. The material then passes upwardly with its lateral edges passing through the field of the two photo-electric units 37 and 37a, over the roller 38, down to the first hem-folding unit 39, up again to the second and third hem-folders 40 and 41, respectively, underneath the presser foot 42 (diagrammatically shown in Figure 3) of the sewing machine 43, from where the material is pulled around rollers 44, 45 and 46, and thence vertically down to receptacle 47. It should also be noted that after passing the photo-electric devices 37 and 37a, the material is engaged by cutter 48 and subjected to certain other manufacturing steps which will not herein be described, inasmuch as they are adequately disclosed in the said parent application and have no direct bearing on the present invention.

In the form of my invention illustrated, the roller 38 is the actuating member which pulls the material 30 upwardly, although this invention is not limited to this specific arrangement, inasmuch as other elements with which the material comes in contact may constitute the mechanism for operatively moving it through the apparatus. Actuating roller 38 is provided with a friction surfacing 51, such as emery cloth, so as to effectuate a secure grip upon the material. Said roller 38 is mounted upon shaft 52 which extends into gear box 53, and by suitable geared mechanism of a conventional nature and not herein shown is connected to a clutch mechanism like that shown and described in my said parent application Serial No. 341,503.

As the material moves upwardly under the influence of said roller 38, it comes in contact with the control drum 36 as aforesaid, which drum is accordingly rotatably actuated by said material. This drum contains two groups of slats disposed about the periphery of the drum and in parallel relation to its axis, the slats 72 in the group on the left side of the drum having their inner ends in adjustable interlocking engagement with the corresponding ends of the slats 73 on the right side of the drum. As aforesaid, the said slats are preferably covered with a friction surfacing, such as emery cloth, so as to provide a secure frictional grip between the material and the slats. The internal portion of the control drum 36 contains a shaft 74 mounted at bearings 75, said shaft having fixedly mounted thereupon at intervals the disc-like supports 76. Extending through the said supports along a circular portion thereof adjacent the aforesaid slats 72 and 73 are a plurality of spaced rods 77 disposed in parallel relation to shaft 74, these rods being shown secured in place by nuts 78. The arrangement of supports 76 and rods 77 constitutes an internal cylindrical squirrel cage over which are disposed the aforesaid slats in a manner to be now described.

Slidably movable over said rods 77 are the slide members 79 each comprising two oppositely disposed lugs 80 joined by a longitudinal connecting portion 81, each of the lugs containing a hole therein for slidably accommodating one of said rods 77. The arrangement is such that each slide member 79 is in slidable engagement with two adjacent rods, each rod extending through oppositely disposed lugs 80 of two adjacent slide members. The said connecting portion 81 of each slide member contains a threaded hole 82; and extending through a corresponding hole in each slot is a screw member 83 the shank of which is in threaded engagement with the walls of hole 82. The head of each screw member 83 is disposed within a depression 84 in the slat, so that no portion of the screw member extends thereabove. The said slide members 79 and screws 84 are arranged in spaced relation longitudinally along the control drum, so that for each rod and slat there are a number of spaced slide members, the particular design illustrated containing four. It is thus apparent that the slats 72 and 73 are held in place about the inner cage by the attachment of screw members 83 to the slide members 79. It is also obvious that the slats 72 and 73 can move in directions parallel to the axis of the drum, the diameter of the drum throughout the length thereof remaining constant and unchanged regardless of the movement of the slats. Regardless of the movement of the slats, the supporting structure of the control drum, embodying the squirrel cage with parts affixed thereto, is capable only of a rotary motion.

The movement of the slats on the control drum is effected through the medium of the two cam members 85 and 85a pivotally mounted at 86 at opposite ends of the control drum. In the preferred arrangement, each side of the control drum is provided with a framework 87 which supports not only the said rods 32, 33, 34 and 35, but also the vertical shaft 88 upon which the said cam members are mounted. Each cam member contains a centrally disposed sleeve 89 with an enlarged central aperture 90 through which the shaft 74 extends, the sleeve containing flange 91 and ring 92 between which the rotatably mounted disc 93 is disposed. The said disc contains a plurality of radially disposed cylindrical apertures 94 into which slidably extend the correspondingly disposed cylindrical plungers 95 pivotally mounted at the outer ends of the slats 72 and 73. More specifically, each slat, in the preferred construction of my invention, contains a bifurcated outer end portion connected by a pin 96 upon which one of said plungers 95 is pivotally and slidably mounted. During certain conditions of operation of my apparatus, the oppositely disposed cam members 85 and 85a are angularly disposed with respect to each other, so that those of the plungers 95 that are diametrically opposite the pivotal mountings 86 are farthest removed from each other. When the cam members are in this position, an operative rotation of the control drum 36 will cause a corresponding rotation of disc 93 about the fixed sleeve 89 thereby causing those of the slats 72 and 73 farthest removed from the aforesaid pivotal mountings 86 to be moved outwardly, whereas those of the slats 72 and 73 closest said pivotal mountings have their inner interlocking ends in relatively close relation. In other words, as the control drum rotates, it carries with it the plungers 95, these being guided outwardly by the disc 93 as they move rearwardly away from the said pivotal mountings 86; and as these plungers 95 move outwardly, they carry the corresponding slats 72 and 73 outwardly with them. The resulting arrangement is hence as clearly shown in Figure 4 where the effective length of the control drum is shown to be of progressively greater proportions as the distance from the pivotal mountings 86 increases. Inasmuch as the material 30 initially engages the control drum along a line relatively close to the pivotal mountings 86 of the cam members, and leaves that portion of the rear of the control drum furthermost from said mountings, it is apparent that with the cam members in divergent relation as above indicated, a relatively narrow web will, during its frictional engagement with the control drum, be stretched or tensioned laterally as it progresses rearwardly and upwardly, thereby eliminating all folds and creases, and properly preparing the material for further manufacturing steps.

It is also apparent that if the said cam members 85 and 85a are operatively actuated so that they are in convergent relation, as indicated by the divergent dot-dash lines in Figure 4, there will be a crowding of the web towards the center, a condition that would occur if the web were too wide.

The angular positions of the cam members 85 and 85a are controlled by the two photo-electric units 37 and 37a, to effect a tracking of both lateral edges of the web by means of the coactive operation of the pneumatically operated reciprocating devices 105 and 105a. As will more clearly hereinafter appear, the lateral edges of the web 30 are tracked a predetermined distance apart, the distance being determined by the specific positioning of each of said photo-electric units. Each of the web's lateral edges is accordingly independently held along a straight predetermined path so that the web, depending upon its width, may be stretched, or crowded towards its medial portion, or guided with no stretching or crowding whatsoever when the web is of uniform width. When the web is of varying width, any of these actions may take place, depending upon which action is required to bring the edges of the web to their respective predetermined paths. The preferred setting of the said photo-electric units 37 and 37a, where a uniform width of web is desired, is preferably such as to crowd the edges inwardly, so that the elasticity of the web will not tend to cause the edges to return to their pre-corrected original positions as would occur if the web were stretched.

The cam members 85 and 85a are caused to oscillate by the said reciprocating devices 105 and 105a, these being actuated through the medium of the photo cells of 37 and 37a, respectively. Inasmuch as the said cam members control the relative positions of both banks of slats, it is apparent that the corresponding oscillating action of the cam members will impart a corrective action to the web moving upwardly in engagement with said slats. If, for example, the cam member 85 were actuated to the left by the said reciprocating device 105 so as to produce a counterclockwise rotation thereof about its mounting 86, the web in engagement with the control drum will be caused to shift laterally to the left a corresponding distance—this lateral shifting movement constituting a corrective action, as will hereinafter appear. Likewise, upon a movement of the cam member 85 to the right, a corresponding corrective action will occur in the opposite direction. Similarly, oscillations of the cam member 85a will impart corrective movements to the web on the left side of the control drum.

The frequency of oscillation of the two cam members 85 and 85a will vary in accordance with their response to their respective photo-electric units 37 and 37a. When the oscillations are synchronous, the banks of slats will move in the same direction, and when the frequency of oscillation is 180° apart, they will move in opposite directions, and different combinations of oscillations of both banks of slats will occur at intermediate times. The arrangement is hence such as to enable a corrective action to be continuously imparted to the web without in any way affecting the predetermined spreading, tensioning or crowding effect of the web.

The direct mechanical connection to said cam members 85 and 85a for effecting the aforesaid oscillations thereof is via the piston rods 103 of each of the pneumatically operated reciprocating devices 105 and 105a connected to the cam member arms 101 and 101a, respectively. Each of said piston rods is pivotally connected to its cam member at 104 whereby upon a reciprocating action of the piston rods, the cam members will be correspondingly actuated. The said reciprocating devices 105 and 105a each contain a cylinder 106 in which the piston 107, attached to piston rod 103, reciprocatingly moves. Extending through the walls 108 and 109 are the air passageways 110 and 111 which communicate through pipe 112 to fitting 113 connected to a suitable source of air supply. The device is further provided with a valve member 114 containing two oppositely disposed recessed portions 115 and 116 in registry with passageways 110 and 111 respectively, said recesses forming connecting ports between pipe 112 and the aforesaid passageways. The terminal ends of the valve are pivotally connected to armatures 117 and 118 of solenoids 119 and 120, respectively. Said solenoids are electrically connected to the photo-electric means in the manner clearly shown in Figure 8. For example, the photo-electric device 37 is electrically connected by leads 121 to the relay 122 adapted to actuate its armature 123 against the action of spring 124. The photo-electric device 37a is connected to similar electro-mechanical means.

When the relay is not excited by the photo-electric cell, the circuit through conductor 125 will be closed, thereby actuating solenoid 120; but when the relay is operatively actuated by the photo-electric device, it will draw the armature 123 to it, to close the circuit through conductor 126, thereby actuating solenoid 119. In this manner the solenoids 119 and 120 are operatively actuated by the photo-electric means, to cause a reciprocating movement of the valve 114. When the valve is in the position shown in Figure 6, the air will pass from pipe 112 through port 116 and passageway 111 into the cylinder to cause a movement of the piston 107 to the right; and when the armature 118 is drawn to the left, it will cause piston 114 to correspondingly move to the left, resulting the passage of air through port 115, passageway 110, into the cylinder, thereby causing the piston 107 to move to the left. It will further be observed that when air passes into the cylinder through one port 111, the opposite port 110 becomes an outlet passageway for the air on the opposite side of the piston, which air enters the region of recess 127 of the piston and then out into the atmosphere through port 128.

For webs traveling at relatively high speeds, and where a greater control of the corrective action is required, I prefer to use the arrangement set forth in Figures 19 and 20. The reciprocating device 205 is basically as that shown in Figure 6, containing a cylinder 106a and slidably movable therein a piston 107a associated with the piston rod 103a pivotally connected to the cam member arm 101, whereby the associated cam member is operatively oscillated upon the reciprocating action of said piston 107a. The valve member 114a is operatively associated with passageways 110a and 111a and with pipe 112a substantially in the manner shown in Figure 6. The outlet ports 128a are each associated with adjusting screws 206, whereby upon an operative manipulation of said screws, the openings of said ports can be adjustably restricted. The frequency of oscillation of the piston rod 103a can thus be regulated, thereby imparting to the associated cam member a corresponding rate of oscillation. For example, a greater restriction of the exhaust ports 128a will result in a choking effect which will reduce the frequency, whereas a removal of such restriction will tend to increase the frequency.

The cylinder 106a is also provided with two auxiliary exhaust valves 207 and 208 these being normally kept closed by the action of the springs 209 and 210, and being adapted to be opened through the action of the solenoids 211 and 212 operatively associated therewith in a manner to be hereinafter described. When such valves are opened under the influence of said solenoids, the auxiliary exhaust ports 213 and 214 will permit a rapid escape of the compressed air within the cylinder, thereby facilitating the movement of piston 107a and permitting a greater sensitivity in the corrective action, as will hereinafter appear.

Figure 19 diagrammatically represents three photo units 215, 37a and 216, the central unit 37a being operatively associated with the solenoids 119a and 120a connected to valve member 114a, whereas the other two units are disposed on opposite lateral sides of said central unit 37a, the photo unit 215 being associated with solenoid 212 and the photo unit 216 being associated with the photo unit 211. The photo units may be of any conventional construction, and where used with diaphanous material, should preferably be of the type illustrated in Figures 12 to 18.

For normal operation, only the central photo unit 37a is effective in keeping the edge 30a of the web 30 on its predetermined path, in the manner hereinabove set forth. But when the web is traveling at high speeds, or when the speed of correction afforded by the said central photo unit 37a together with its associated parts is not rapid enough in its action, there is a possibility that the web 30 may travel either to the left or right of the field of operation of central photo unit 37a. If it travels towards the left and operatively intercepts the beam of the photo unit 215, the solenoid 212 will be actuated to cause the auxiliary exhaust valve 208 to open and permit the air confined within the piston to pass therethrough into the atmosphere. In this manner there will be effected a quick corrective action, inasmuch as the piston 107a in its movement towards the right will meet with little resistance, and thereby cause the cam member attached to arm 101 to quickly move to the right and guide the web towards the right. As soon as the web 30, because of said corrective action to the right, leaves the beam of photo unit 215, the auxiliary exhaust valve will return to its normal closed position under the action of spring 210. Thereafter the central photo unit 37a resumes its normal operation. In the same manner, when the web, in its movement towards the right passes the beam of photo unit 216, the solenoid 211 will be actuated to cause an opening of auxiliary valve 207, whereby a corrective movement of the piston 107a, will be facilitated. This will cause the web to move towards the left because of the corresponding movement of the associated cam member under the influence of piston rod 103a, whereupon the beam of photo unit 216 will again be intercepted by the web, and the auxiliary exhaust valve 207 will return it to its normal closed position under the action of the spring 209.

The wiring diagram of Figure 20 clearly illustrates the electrical connections between the photo units and the exhaust valve solenoids. It will be observed that the action of the central photo unit on the associated solenoids 119a and 120a is substantially similar to that shown in Figures 6 and 8. When the beam of photo unit 215 is not intercepted by the web, the circuit through the solenoid 212 is broken—the circuit being closed only when the beam is intercepted, by virtue of the breaking of the circuit through relay 217. On the other hand, when the beam of photo unit 216 is intercepted by the web, the circuit through the solenoid 211 is broken by the breaking of the circuit through relay 218, the circuit being closed only when the web is moved out of the field of the beam.

In either of the methods above described, it is evident that the oscillating action of each of the cam members 85 and 85a is continuous, and is independently controlled solely by the photoelectric units 37 and 37a. Each lateral edge of the web is caused to move along a predetermined path, both paths being a predetermined distance apart so that the web leaving the control drum is of a predetermined uniform width whereby it may be operatively received by a tentering frame or other suitable apparatus.

When material 30 is a curtain or some lacy fabric, or some other material containing interstices or having some light-transmitting properties, there is always the danger that sufficient light from the light source of the photo-electric device will penetrate the material to operatively affect the light-sensitive means. To eliminate this condition, I have devised a system where the light beam is reflected by at least two mirrors before reaching the light-sensitive means. By referring to Figure 13, the light source 129 is illustrated as directing a beam of light 130 at the mirror 131 from which it is reflected to mirror 132, and from the latter mirror it is reflected through window 133 to the light-sensitive cell 134. When the line of travel of the material 30 is such that the selvage 49 clears the final reflected beam 135, said beam is obviously completely unobstructed and is capable of directing its full energy upon the cell 134. Under these conditions, the relay 122 (Figure 8) becomes energized, will attract the armature 123 against the action of spring 124 and will accordingly energize solenoid 119, which will tend to move material 30 to the right.

When the material 30 is moved to the right to partially intercept final beam 135 (Figure 13), only a portion of such beam is directed with full intensity upon cell 134, the relatively heavy selvage 49 casting a shadow 136 upon the cell. The cell preferably selected for use with this invention is of such sensitivity that it will not be actuated by this beam of reduced intensity, and the spring 124 (Figure 8) will accordingly retract armature 123 to close the circuit through solenoid 120, which will tend to move the material 30 to the left.

Figure 14:
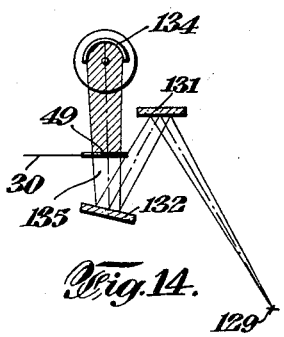
Figures 14, 15 and 16 are views similar to Figure 13, showing three other beam-intercepting positions of the material.

When the material 30 is in the position shown in Figure 14, with the selvage margin completely intercepting the final reflected beam 135, the cell 134 will obviously remain unenergized, to cause an operative movement of material 30 to the left, as above-indicated.

Figure 15:
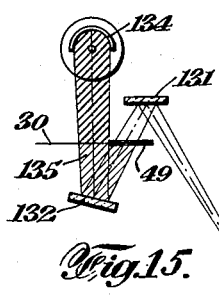

When material 30 is in the position shown in Figure 15, with the selvage 49 passed beyond the final reflected beam 135, it is apparent that the beam from the light source 129 would have to pass through the said selvage portion after being reflected from mirror 131, and the final reflected beam 135 will again have to pass through the material 30. The beam from the light source is hence intercepted twice during its course of travel to the cell 134, and its intensity is accordingly sufficiently reduced to prevent the cell from being energized—thereby causing the material 30 to be moved to the left, as aforesaid. If the light source, however, had been located at the position of mirror 132, it is apparent that the direct beam of light through a diaphanous material might energize cell 134, thereby preventing the corrective movement of material 30 to the left.

Figure 16:
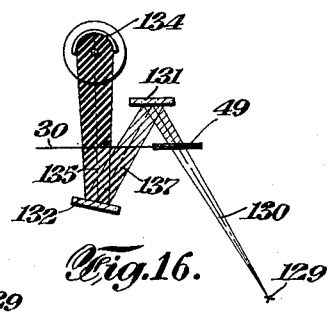
Figure 17:
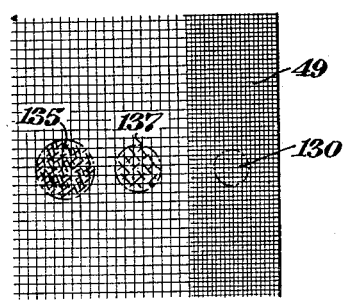
Figure 17 is a diagrammatic front view of curtain material in the position shown in Figure 16, the beams of light passing through the material being diagrammatically represented by circles.

When the material 30 had moved to the right as indicated in Figure 16, the beam 130 from light source 129 will have to penetrate not only the selvage 49, but also the material 30 twice. In other words, the reflected beam of light 137 from mirror 131, after penetrating selvage 49, must penetrate material 30 in order to reach mirror 132, and then must again penetrate material 30 in order to reach cell 134. With the arrangement above illustrated, it has been found that even an exceedingly thin and diaphanous material, with relatively large interstices, will serve to so reduce the intensity of the beam as to render it incapable of actuating cell 134. By referring to Figure 17, it will be seen that the beam of light 130 intercepts the selvage 49 as indicated, the return beam 137 being diagrammatically shown as being of somewhat reduced intensity, and the final reflected beam 135 being shown of still further reduced intensity.

Figure 18:
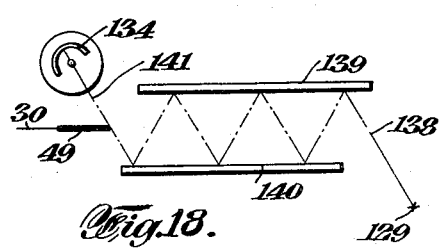
Figure 18 is a diagrammatic view, substantially similar to that of Figure 13, showing a modified arrangement of the photo-electric combination.

The same principle above described can be employed to an extended degree as illustrated in Figure 18. Here the light source 129 directs its initial beam 138 against the relatively long mirror 139, the beam being several times reflected between mirror 139 and oppositely disposed mirror 140 until the final reflected beam 141 is received by the cell 134. It is apparent that this arrangement would be effective with an exceedingly sheer material, inasmuch as the beam of light would be intercepted several times before finally reaching the cell, so that the final beam 141 would be of such reduced intensity as to render it incapable of operatively effecting cell 134.

After the web 30 has passed the photo-electric devices 37 and 37a, it passes over the actuating roller 38, as aforesaid. Thereafter the material can be received by a suitable roller, or deposited in a receptacle for subsequent disposition, or may be passed through further manufacturing operations. In the embodiment of my invention illustrated, the web is brought into engagement with a cutter wheel 48 to remove the selvage margin 49, and thereafter folded and sewed by a hem stitching machine, whereafter it is deposited within receptacle 47. The details of these manufacturing devices will not herein be set forth, inasmuch as they are adequately described in my said parent application, and in further view of the fact that such a description is not necessary for an understanding of the present invention. Neither will any description be herein attempted of the actuating mechanism for this apparatus which is fully disclosed in the said parent application, nor of the clutch and release mechanism actuated by rod 173, fully described in my Patent No. 2,240,192.

It is understood that other additional forms of apparatus and adaptations of the method of my invention can be employed beyond and in addition to that hereinbefore described, all within the scope of the appended claims.

What I claim is:

1. In an apparatus to control the flow of a web of goods with the lateral edges thereof moving along predetermined parallel paths, actuating means adapted for engagement with the web for moving it in the direction of its length, rotary means in the path of said web, laterally movable friction means on said rotary means and adapted to frictionally engage the web, said friction means intercepting at least one of said parallel paths, guiding means operatively associated with said friction means for actuating said friction means laterally, a cylinder, a reciprocating piston therein operatively connected to said guiding means, conduits for a motive fluid communicating with the cylinder, valve means operatively associated with said conduits, main photo-electric means in the path of said web and adapted for operative coaction with an edge thereof, solenoid means operatively connecting said main photo-electric means and said valve means, auxiliary exhaust means operatively associated with said cylinder, auxiliary photo-electric means in predetermined lateral relation with respect to said main photo-electric means and adapted for operative coaction with the said lateral edge of the web, and solenoid means connected to said auxiliary exhaust means and operatively associated with said auxiliary photo-electric means.

2. In an apparatus to control the flow of a web of goods with the lateral edges thereof moving along predetermined parallel paths, actuating means adapted for engagement with the web for moving it in the direction of its length, rotary means in the path of said web, laterally movable friction means on said rotary means and adapted to frictionally engage the web, said friction means intercepting at least one of said parallel paths, guiding means operatively associated with said friction means for actuating said friction means laterally, a cylinder, a reciprocating piston therein operatively connected to said guiding means, conduits for a motive fluid communicating with both ends of the cylinder, valve means operatively associated with said conduits, a central photo-electric unit in the path of said web and adapted for operative coaction with an edge thereof, solenoid means operatively connecting said central unit and said valve means, auxiliary exhaust valves operatively associated with both ends of the cylinder, two auxiliary photo-electric units laterally flanking said central unit and adapted for operative coaction with the said lateral edge of the web, and solenoid means connected to each of said auxiliary exhaust valves and operatively associated with one of said auxiliary units.

3. In an apparatus to control the flow of a web of goods with the lateral edges thereof moving along predetermined parallel paths, a rotatably mounted control drum in the path of the web and comprising two adjacent cylindrical banks of slats with a common axis and of equal and uniform diameters, the slats on one bank being in substantial alignment with the corresponding slats on the other bank and all slats being movably mounted in parallel relation to the common axis and adapted to frictionally engage the web; guiding cam means pivotally mounted at opposite ends of the drum, the outer ends of each bank of slats being operatively connected with the adjacent cam means, two separate oscillating control means each operatively connected with one of said cam means; two groups of photo-electric units, one along each of said parallel paths and adapted for operative association with the adjacent lateral edge of the web; each of said oscillating control means containing a cylinder, a reciprocating piston therein operatively connected to one of said cam means, conduits for a motive fluid communicating with the cylinder, valve means operatively associated with said conduits, and auxiliary exhaust means operatively associated with the cylinder; each of said groups of photo-electric units containing one main unit and at least one laterally adjacent auxiliary unit; solenoid means operatively connecting each of said main units with the said valve means on one of said cylinders; and solenoid means operatively connecting each of said auxiliary units with the auxiliary exhaust means on the corresponding cylinder.

4. In an apparatus to control the flow of a web of goods with the lateral edges thereof moving along predetermined parallel paths, actuating means adapted for engagement with the web for moving it in the direction of its length, rotary means in the path of said web, laterally movable friction means on said rotary means and adapted to frictionally engage the web, said friction means intercepting at least one of said parallel paths, guiding means operatively associated with said friction means for actuating said friction means laterally, a cylinder, a reciprocating piston therein operatively connected to said guiding means, conduits for a motive fluid communicating with both ends of the cylinder, valve means operatively associated with said conduits and containing a reciprocating valve member, main exhaust ports, and adjustable means to restrict the openings of said exhaust ports; main photo-electric means in the path of said web and adapted for operative coaction with an edge thereof, solenoid means operatively connecting said main photo-electric means and said valve member, auxiliary exhaust means operatively associated with said cylinder, auxiliary photo-electric means laterally adjacent to said main photo-electric means, and adapted for operative coaction with the said lateral edge of the web, and solenoid means connected to said auxiliary exhaust means and operatively associated with said auxiliary photo-electric means.

5. In an apparatus to control the flow of a web of goods with the lateral edges thereof moving along predetermined parallel paths, actuating means adapted for engagement with the web for moving it in the direction of its length, rotary means in the path of said web, laterally movable friction means on said rotary means and adapted to frictionally engage the web, said friction means intercepting at least one of said parallel paths, guiding means operatively associated with said friction means for actuating said friction means laterally, a cylinder, a reciprocating piston therein operatively connected to said guiding means, conduits for a motive fluid communicating with both ends of the cylinder, valve means operatively associated with said conduits, a central photo-electric unit, solenoid means operatively connecting said central unit and said valve means, auxiliary exhaust valves operatively associated with both ends of the cylinder, yieldable means normally keeping said auxiliary valves closed, at least two auxiliary photo-electric units, one on each side of said central unit and laterally adjacent thereto, all of said photo-electric units being in the path of said web and adapted for operative coaction with the adjacent lateral edge thereof, and solenoid means associated with each of said auxiliary photo units and adapted to actuate the corresponding auxiliary exhaust valve against the action of said yieldable means.

6. In an apparatus to control the flow of a web of goods with the lateral edges thereof moving along predetermined parallel paths, actuating means adapted for engagement with the web for moving it in the direction of its length, rotary means in the path of said web, laterally movable friction means on said rotary means and adapted to frictionally engage the web, said friction means intercepting at least one of said parallel paths, guiding means operatively associated with said friction means for actuating said friction means laterally, a cylinder, a reciprocating piston therein operatively connected to said guiding means, conduits for a motive fluid communicating with both ends of the cylinder, valve means operatively associated with said conduits, a central photo-electric unit, solenoid means operatively connecting said central unit and said valve means, auxiliary exhaust valves operatively associated with both ends of the cylinder, two auxiliary photo-electric units, one on each side of said central unit and laterally adjacent thereto, all of said photo-electric units being in the path of said web and adapted for operative coaction with the adjacent lateral edge thereof, a solenoid operatively connecting the auxiliary photo unit at the right of the central unit with the auxiliary valve at the left end of the cylinder, and a solenoid operatively connecting the auxiliary photo unit at the left of the central unit with the auxiliary valve at the right end of the cylinder.

CHARLES MEYER.